United States Patent [19]
Rochelle

[11] 3,729,941
[45] May 1, 1973

[54] METHOD AND APPARATUS FOR LAYING PIPELINE

[75] Inventor: William R. Rochelle, Houston, Tex.

[75] Assignee: Brown & Root, Inc., Houston, Tex.

[22] Filed: Sept. 7, 1971

[21] Appl. No.: 177,964

Related U.S. Application Data

[62] Division of Ser. No. 822,409, May 7, 1969.

[52] U.S. Cl. ..................61/72.3, 166/.6, 285/24, 285/302, 285/317
[51] Int. Cl. ..............................F16l 1/00, F16l 27/12
[58] Field of Search..........................61/72.3, 72.1; 285/18, 21, 24, 25, 28; 166/.6; 285/302, 317

[56] References Cited

UNITED STATES PATENTS

| | | | |
|---|---|---|---|
| 3,459,442 | 8/1969 | De Yarmett et al.................285/27 |
| 3,434,296 | 3/1969 | Otteman et al......................61/72.3 |
| 3,431,739 | 3/1969 | Richardson et al..................61/72.3 |
| 3,585,805 | 6/1971 | Vincent..............................61/72.3 |
| 3,599,436 | 8/1971 | Lochridge..........................61/72.3 |

*Primary Examiner*—Jacob Shapiro
*Attorney*—Burns, Doane, Swecker & Mathis

[57] ABSTRACT

A method and apparatus for making a connection between conduits, either submerged or to be submerged, characterized by the provision of a telescoping terminus on a flowline. In some operations where the flowline is laid either toward or away from an underwater installation, it may be lowered, while maintaining the terminus substantially fixed with respect to the remainder of the flowline, to a submerged position where the terminus is spaced from the installation. Subsequently, the terminus is telescoped into engagement with an alignment means, such as a riser adapter, either through diver assistance, or by remote operation of a terminus moving means. This means may be provided by a flexible drawline, which may be threaded through the alignment means, attached to the terminus, and subsequently tensioned to telescope the terminus. Release of the drawline may be accomplished through the application of fluid pressure.

Means are provided for latching the terminus into the riser adapter and for locking a slip joint between the terminus and the remainder of the flowline.

Other connections between the terminus and an installation conduit may be accomplished adjacent the surface of the water. The conduit and pipeline may be lowered together, with the terminus locked, and after lowering the terminus may be freed to permit proper positioning of the installation conduit relative to the installation. Alternatively, the lowering operation may take place with the installation conduit in its proper position relative to the installation and with the terminus unlocked, whereupon relative movement of the telescoping terminus facilitates the operation of lowering the installation conduit and the connected flowline. After lowering the slip joint may be locked.

17 Claims, 11 Drawing Figures

Patented May 1, 1973

INVENTOR
WILLIAM R. ROCHELLE

INVENTOR
WILLIAM R. ROCHELLE

METHOD AND APPARATUS FOR LAYING PIPELINE

RELATED APPLICATIONS

This application is a division of copending application Ser. No. 822,409, filed May 7, 1969 for METHOD AND APPARATUS FOR MAKING SUBMERGED PIPELINE CONNECTIONS.

BACKGROUND OF THE INVENTION

This invention relates to a method and means for connecting submerged or submergible conduits. More particularly, this invention relates to a method for coupling a pipeline to an installation or other conduit of an offshore well system.

In laying pipeline along a submerged surface, it has been common for many years to rely primarily on divers to complete the initial or terminal connection of pipeline to an underwater well installation. More recently, it has been proposed to make pipeline connections by using a flexible line to draw the pipeline terminus into an alignment means provided on a submerged wellhead in order to eliminate the need for diver assistance.

By conventional methods and with conventional apparatus, whether or not a diver is to be employed, such pipeline connections involve the manipulation of not only the pipeline terminus, but also the manipulation of the bulk of the major pipeline body adjacent the submerged installation.

Exemplary of the prior proposals involving the use of a flexible drawline are those wherein one end of the drawline is connected either to a specially constructed, releasable flowline head mounted on the flowline coaxially therewith, or to an alignment follower mounted about the external periphery of the flowline terminus. In these arrangements, the other drawline end may be tensioned from a surface located station to pull the flowline head or follower into an alignment means provided on a submerged wellhead. The flowline may then be latched into position.

Although such connection methods and apparatus may, in part, be adequate, they may sometimes prove unsatisfactory for a number of reasons. For example, the necessity of manipulating a major portion of the heavy pipeline increases the difficulty of controlling and manipulating the pipeline during the connection.

Furthermore, a failure of the drawline and the resulting loss of tension on the pipeline could be dangerous, insofar as uncontrolled movement of the bulk of the pipeline may cause damage to both personnel and equipment.

It would, therefore, be desirable to provide a submerged pipeline connection method and apparatus wherein the control over the pipeline terminus to be connected is increased.

In this connection, such control would be particularly desirable from the standpoints of increasing safety of divers, when relied upon, and minimizing the possibility of equipment damage.

Moreover, one further disadvantage of known and proposed connection systems (whether or not a drawline is employed) stems from the fact that it is often necessary or desirable (for example, in instances wherein a riser connection, rather than a submerged wellhead connection is to be made) to lay the pipeline terminus on the submerged surface prior to making the terminal connection. In such instances, extreme caution is required to avoid an underlay or overlay of the pipeline terminus, which may necessitate the removing, adding or repositioning of pipeline sections in order to compensate for the projection of the pipeline beyond or short of the riser.

It would, therefore, be highly desirable to provide a method and apparatus for making a pipeline connection, wherein a telescoping terminus would be adapted to readily compensate for anticipated differences in the distance between the pipeline terminus and the conduit to which it is to be connected.

The provision of a telescoping terminus on a pipeline would also be desirable from the standpoint of facilitating surface connection to an installation conduit, such as a riser.

Another disadvantage of one previously proposed drawline type connection system relates to the incorporation of a rather complex, mechanical drawline releasing means mounted on the flowline head. Since this releasing means is pre-set to be triggered by a cam and follower arrangement, the possibility of premature release, resulting from system vibration, exists. In addition, difficulties may be encountered in gaining access to the triggering elements in the event of sticking, as they are located within the confines of the underwater installation immediately preceding activation.

It would, therefore, be highly desirable to provide a releasable connection between the flowline and the drawline that involves a conveniently operable releasing method and apparatus, activated remotely and at a selectable time.

SUMMARY OF THE INVENTION

It is, therefore, a general object of the invention to provide a method and apparatus for making an underwater pipeline connection, which method and apparatus are intended to obviate or minimize disadvantages of the sort previously noted.

It is a particular object of the invention to provide a method and apparatus for making a flowline connection, wherein the flowline is provided with a telescoping terminus.

It is a related object of the invention to provide an improved slip joint for a telescoping terminus of underwater conduit means characterized by an effective locking and sealing arrangement.

It is a further object of the invention to provide a method and apparatus for making an underwater conduit connection wherein a flexible drawline is adapted to draw a telescoping terminus of the underwater conduit into an alignment means provided on the underwater installation.

It is another object of the invention to provide such a method and apparatus wherein the telescoping connection between the underwater flowline and the underwater installation may be remotely accomplished.

It is a related object of the invention to provide an improved means for releasing the flexible drawline from the terminus of an underwater flowline.

It is still a further object of the invention to provide fluid responsive means for releasably coupling a drawline to a conduit section.

It is still another object of the invention to provide an improved method for remotely coupling an underwater flowline to an underwater installation.

It is yet another object of the invention to provide an improved internally telescoping terminus for an underwater flowline.

It is another object to provide an improved method and apparatus for connecting an underwater flowline to a submerged or submergible riser installation.

One preferred form of the invention, intended to accomplish at least some of the foregoing objects, includes a pipeline provided with an internally telescoping terminus adapted to be coupled to an alignment means provided on another conduit which may be part of an underwater installation. Preferably, this alignment means comprises an adapter mounted on the terminal portion of a riser.

The telescoping terminus is extended, for example, by a flexible drawline threaded through the riser from a surface located station and connected to the telescoping terminus. Tension remotely applied to the drawline results in the movement of the terminus into the alignment means of the riser.

The riser and the terminus may be provided with mutually cooperating parts for latching and sealing the terminus within the alignment means. Subsequent to this latching and sealing, the drawline, if employed, may be released from the terminus by application of fluid pressure to a fluid responsive means for releasably coupling the drawline to the telescoping terminus.

In instances where this fluid pressure is to be provided by flooding of the riser, any misalignment between the terminus and the alignment means provides a fail-safe feature insofar as pressure build-up sufficient to actuate the fluid responsive means, and thereby release the drawline, is not readily obtainable.

A slip joint between the telescoping section and the flowline conduit body is locked and sealed after engagement of the terminus with the alignment means, either manually or remotely, through the application of fluid pressure to maintain the two fixed relative to one another.

The telescoping terminus on the flowline may alternatively be extended into engagement with the alignment means either manually or by a suitable piston and cylinder assembly. In such instances, no means for releasably connecting the drawline to the conduit need be provided.

In another preferred form of the invention, the telescoping terminus, when retracted, may be connected to a riser adjacent the surface of the water. The connected terminus and riser are then lowered, with the telescoping movement of the terminus providing a make-up spacer.

DRAWINGS

A preferred form of the invention is illustrated in the accompanying drawings in which.

DETAILED DESCRIPTION

General Summary and Scope of the Invention

Figure 1:
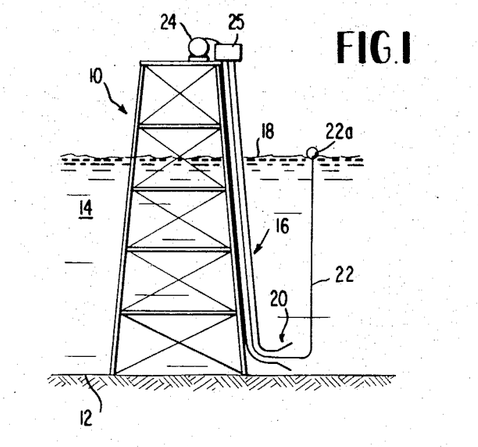
FIG. 1 is a schematic illustration of a drawline threaded through a riser.

Referring now to FIG. 1, the schematic illustration of an underwater installation, including an offshore platform 10, is there shown. This platform 10 is situated on a surface 12 submerged beneath a body of water 14.

Mounted on the platform 10, by any suitable means, is a generally J-shaped riser 16, which extends above the water surface 18 and is provided with a generally frusto-conical alignment adapter 20 at the submerged end thereof. A "fishline" or drawline 22, controlled by a winch 24, is threaded through the riser 16 and the adapter 20, and may be floated upwardly to the water surface 18 by a float means, illustrated at 22a. Drawline 22 may have been included in riser 16 when this riser was installed.

The threading of the drawline 22 may be accomplished by sealingly and telescopingly passing the wireline through wireline stuffing box 25 at the top of the riser 16. Reference may be had to page 3799 of the 1968-69 Catalog of Otis Engineering Corporation, Dallas, Texas, for details of the structure and mode of operation of a suitable stuffing box. The disclosure of this Catalog is hereby incorporated by reference. With line 22 passing through stuffing box 25, float means 22a could be pumped down riser 16 by injecting pressurized fluid in riser 16 between the stuffing box and float.

Figure 2:
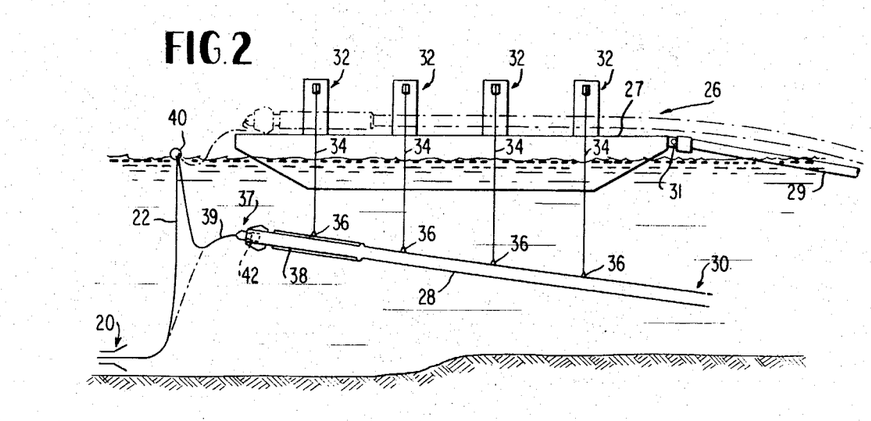
FIG. 2 is a schematic illustration of flowline with a telescoping terminus being lowered from a lay barge at the end of a laying toward operation.

Adjacent the platform 10, a floating barge 26 is positioned, as schematically illustrated in FIG. 2. Barge 26 supports the terminal portion 28 of an elongate, flexible pipeline 30. The major portion of the pipeline 30 (not shown), having been previously laid toward the platform 10 by slidably moving the barge 26 with respect to the pipeline, rests on the submerged surface 12.

Preferably, the laying of this major portion of pipeline would have been accomplished using a ramp 27, having an at least partially submerged, adjustably buoyant pontoon 29 pivotally attached thereto, as indicated at 31. For a more detailed description of the structure and method of operation of such a ramp and pontoon, reference may be had to the disclosures of U.S. Pat. Nos. 3,280,571 and 3,390,532, assigned to the assignee of the present invention. The disclosures of these patents are hereby incorporated by reference.

The "laying toward" operation is concluded by progressively lowering the terminal pipeline portion 28 from the barge 26, using suitably spaced davits 32 and adjustable length, pipeline support lines 34 attached to and spaced along the terminal pipeline portion 28, as indicated at 36.

Figure 3:
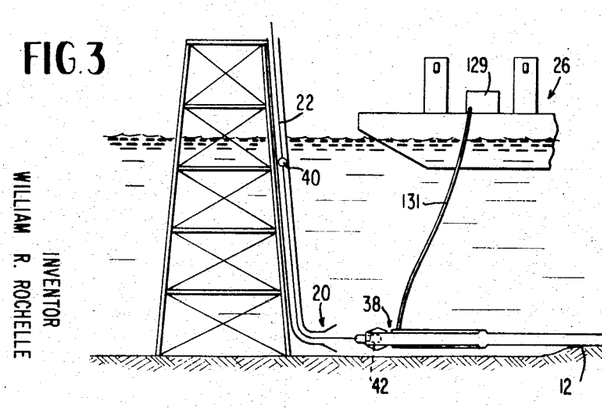
FIG. 3 is a schematic illustration of the relative position of the riser and the pipeline lowered according to the method illustrated in FIG. 2.

Provided at the terminus of the terminal pipeline portion 28 is an internally telescoping conduit section 38. During lowering of that portion 28 to the submerged surface 12, the telescoping terminus 38 is maintained in its retracted position so that upon lowering it is located at a position spaced from the riser adapter 20 by a distance less than the amount of permitted telescoping movement of the terminus 38 (FIG. 3).

One end 37 of a pulling line 39 is attached to the terminus 38, and the other end 40 is fastened to the fishline 22, preferably on barge 26, as indicated in phantom in FIG. 2. Together, the pulling line and the fishline comprise a drawline.

Fishline 22 could have been attached to a relatively heavier drawline 39 on barge 26, with line 22 then serving to draw line 39 through riser 16. Line 39 could then serve as a connection between the winch 24 and the telescoping terminus. The winch 24 may be operated to draw the drawline through the riser 16 so as to keep slack out of the pulling line during lowering of the terminal pipeline portion 28.

It will be appreciated that the pulling line to fishline connection may be made by a diver subsequent to pipeline lowering, in which case, the fishline 22 would not be floated to the surface. It will also be apparent that a single drawline may be employed instead of a coupled fishline and pull line.

Figure 4:
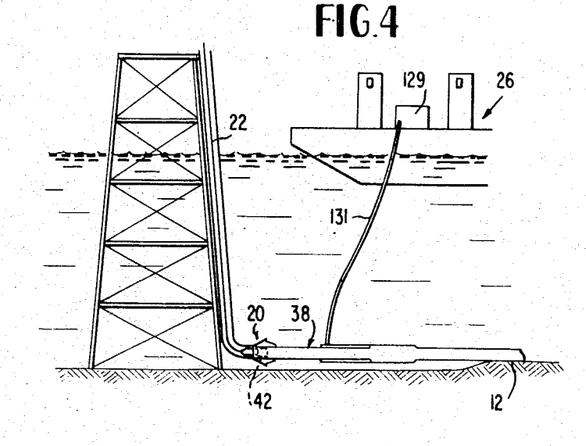
FIG. 4 is a schematic illustration of the telescoping terminus received in the riser adapter.

After the pipeline lowering, tension is remotely applied to the drawline, either by the platform mounted winch 24, or by a suitable crane (not shown) located on the barge 26 and provided with a line connectable to the drawline portion extending upwardly through the riser 16. Thus, the telescoping terminus 38 is telescoped or extended longitudinally with respect to the remaining conduit body 30 into engagement with the riser adapter 20 (FIG. 4).

A fluid responsive drawline releasing means 42 (FIGS. 5A and 6) is then activated and both the drawline and releasing means are retrieved through the riser by continued tension from winch 24 or the like.

A slip joint locking and sealing means 44 (FIG. 5B) between the terminus 38 and the remaining terminal conduit portion 28 is afterwards locked to prevent any relative movement therebetween and to seal the flowline 30 from the water body 14.

As will be apparent from the subsequent detailed description of the invention, the fluid responsive drawline releasing means 42 may be employed without the telescoping joint feature of the invention, although it is particularly advantageous when used therewith. Moreover, mechanical or other release means for the drawline may be provided if desired.

Also, the particular slip joint means 44, whether manually or remotely operated, may be used in other conduit couplings, for example in an underwater flowline replacement or connecting operation remote from the initial and terminal connections.

It will be appreciated that the telescoping feature of the invention is usable not only in making the above described terminal connection in a laying toward operation, but also in accomplishing the initial connection between a pipeline and an underwater installation in a laying away operation. In this latter instance, the pipeline terminus is lowered, and the remainder of the pipeline 30 is subsequently laid, by slidably moving the barge 26 with respect thereto. The ramp 27 and pontoon 29 are preferably used to accomplish the lowering and laying in the manner disclosed in the previously identified U.S. Pat. Nos. 3,280,571 and 3,390,532, the disclosures of which have been incorporated by reference.

In any case, in the foregoing operations, the terminus is lowered while maintaining it in a substantially fixed longitudinal position with respect to the remainder of the conduit portion, by shear pins or the like. Tension may be exerted on the telescoping sections of sufficient magnitude to provide "steering" of the pipeline 30 to generally align the pipeline terminus with the alignment means 20. In this event, the telescoping joint may be temporarily secured against telescoping movement, for example, with shear pins. Such shear pins would shear to permit telescoping movement of joint 38 when the joint was to be extended by the exertion of a heavier pull on the drawline.

Moreover, it is contemplated that the telescoping terminus may be employed, during laying toward or laying away, to compensate for underlay as well as overlay. This would entail lowering the pipeline terminal portion 28 with he terminus 38 located between its fully extended and retracted positions so that it may be manipulated in both longitudinal directions relative to the laid body of the flowline 30.

Furthermore, if an entirely remote, drawline induced, connection is not contemplated in either laying toward or laying away operations, the pipeline terminus 38 may be telescoped by diver assistance or by extension motor means carried by the pipeline terminus. In the latter instance, and in situations where a suitable piston and cylinder assembly is provided for extending the terminus, the use of the drawline releasing means 42 is thereby obviated.

For reasons which will hereinafter become apparent, an internally telescoping terminus, and the use of a drawline threaded through a riser adapter, along with their attendant advantages, are preferred. However, other arrangements of the underwater installation, the telescoping section and the means for extending the telescoping section (e.g., an externally arranged drawline or cable, an externally telescoping section, and/or location of the telescoping section on the installation instead of the riser, as well as the use of an appropriately modified underwater wellhead rather than a riser adapter) are within the scope of the inventive concept. The invention is broadly applicable to interconnecting a pair of conduit means, including sections of a pipeline.

The telescoping terminus may also be advantageously employed to facilitate connections of the pipeline to a riser at the water surface. Such connections at the water surface are often desirable, but usually require precision control of the laying operation since the riser is attached to the platform and therefore fixed with respect to laid portions of the pipeline.

With the telescoping terminus, less precision in operation is required since the telescoping movement permits the riser to be attached to the pipeline at the water surface, and then lowered, after which the distance between the riser and platform may be automatically accommodated by telescoping movement.

Figure 8A:
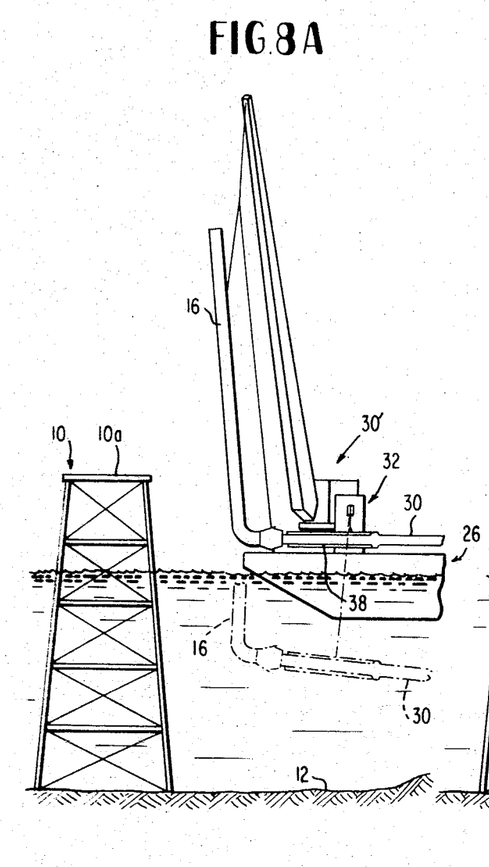
FIGS. 8A, 8B and 8C are schematic illustrations of the procedure for connecting a telescoping pipeline terminus to a riser adjacent the water surface and then lowering and positioning the riser and telescoping terminus.
Figure 8B:
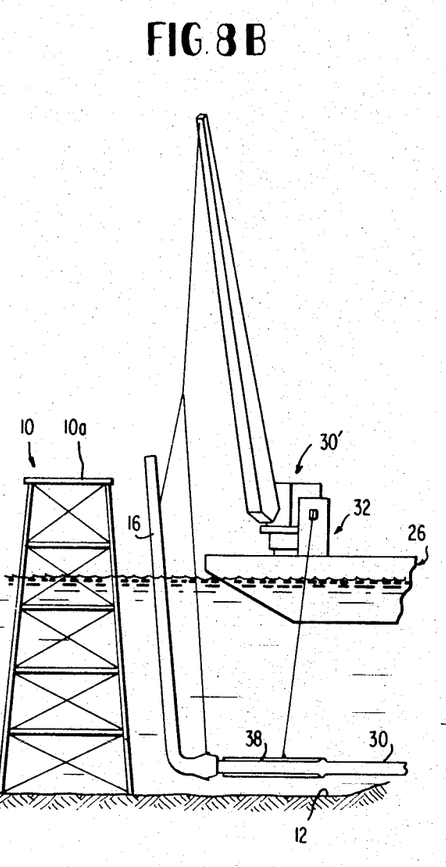
Figure 8C:
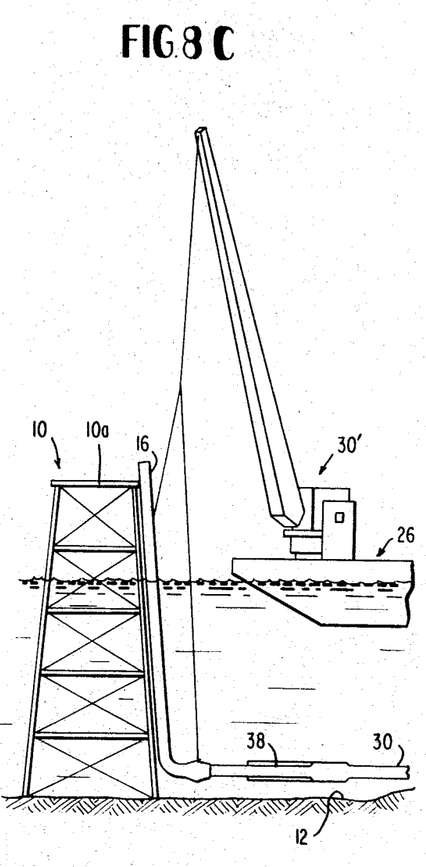

In FIGS. 8A, 8B and 8C schematic illustrations of the connecting and subsequent lowering and positioning of a connected pipeline 30 (having a telescoping terminus 38) and riser 16 are shown.

The lay barge 26 is positioned, upon completion of a "laying toward" operation, adjacent the platform 10. The telescoping terminus 38 of the pipeline 30 is welded or latched (as hereinafter more fully described) to the riser 16, while the riser may be supported by a suitable derrick 30' on the deck of barge 26.

Next, the connected pipeline terminus is lowered with the davits 32, while the riser is concurrently lowered with the derrick. During this lowering, the telescoping terminus is preferably temporarily secured, as for example, by set screw means, or may be free to telescope relative to the pipeline and may be initially disposed in an intermediate telescoped position.

When the pipeline and riser reach the submerged surface 12, they may be spaced from the platform 10, as indicated in FIG. 8B. In such instances the telescoping joint may be extended, possibly with the aid of divers, to move the riser to its position adjacent the platform, as shown in FIG. 8C. This extension is contemplated to be about 20 or 30 feet. The slip joint is then locked and sealed as described hereinafter.

It will be appreciated that merely the elbow portion of the riser, rather than the entire riser, may be connected to the telescoping terminus. After lowering and positioning this elbow portion, the remainder of the riser may be installed.

If the joint 38 was secured against telescoping action by set screw means, mounted for example, in conduit means 28 and peripherally engaging joint 38, a diver may release such set screw or locking means to permit the telescoping movement of joint 38 to take place.

Conjoint movement of riser 16 and joint 38 may be facilitated by an arrangement of underwater sheave means mounted on platform 10 and a draw line extending from the base of the riser, through the sheave means, and to a draw means such as a winch or derrick on the platform working level 10a.

In some instances the riser may be lowered along the side of a tower, and the joint 38 either extended or contracted to position the riser as desired with respect to the tower side.

Laying away operations, wherein the pipeline is connected to the riser and the riser is then lowered on a suitable mono-rail, such as described in U.S. Pat. No. 3,258,928, assigned to the assignee of the present invention, may also be facilitated by the telescoping joint. The method disclosed in that patent (hereby incorporated by reference) may be followed with the addition of the telescoping joint being connected to the riser. The joint permits lowering with less precision control being required, since the telescoping terminus may extend (or retract) and thereby prevent excessive stresses on the connection.

Detailed Assemblies

The Slip Joint Structure and Operation

Figures 5A, 5B:
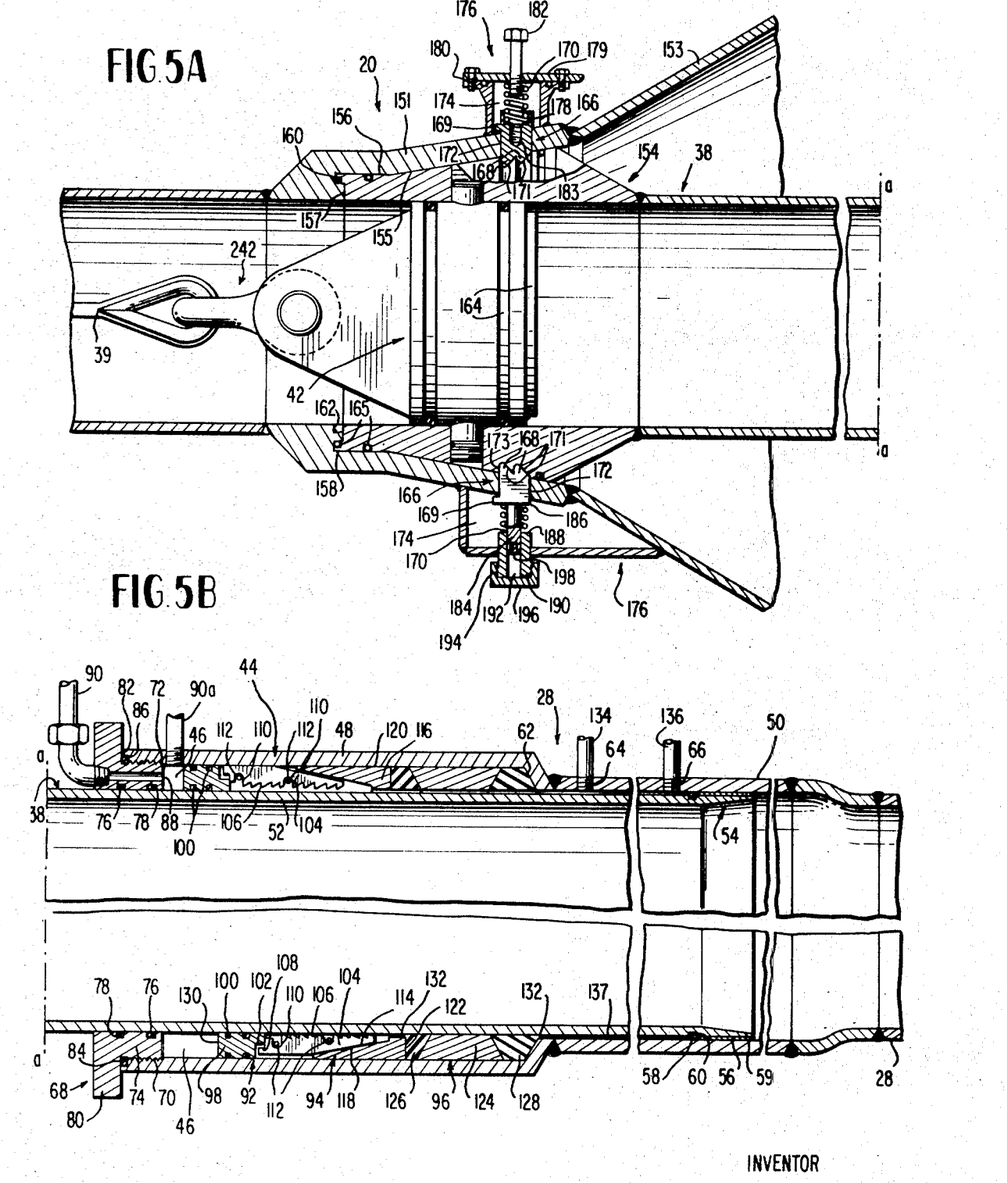
FIG. 5A is a partial cross-sectional, side elevational view of the telescoping terminus latched into the riser adapter.
FIG. 5B is a cross-sectional, side elevational view, continuing from line a-a of FIG. 5A, of one slip joint of the invention.

Referring now to FIG. 5B, a preferred form of the previously identified telescoping terminus 38 and slip joint means 44 is there shown.

The slip joint structure 44 is located in an annular chamber or cylinder 46 defined between an enlarged outer barrel end section 48 of the pipeline terminal portion 28 and the inner pipeline barrel 52 formed by the trailing end of the telescoping section 38.

Both the outer and inner barrels, as well as the slip joint components, are generally cylindrical, or present generally cylindrical or frusto-conical surfaces, so that cross-sectional views thereof are not deemed necessary.

The internal diameter of the inner barrel 52 is substantially constant and equal to the internal diameter of the pipeline portion 28 which extends away from an outer barrel portion 50. In this manner, barrel 52 provides a passage through joint 38 which is equal in size to the cross section of pipeline 28.

The internal diameter of the outer barrel section 50, i.e. the zone between enlarged section 48 and pipeline 28, is slightly greater than the external diameter of the inner barrel 52 so as to telescopingly receive the barrel 52. At the longitudinally innermost end 54 of the inner barrel, an annular "line up" shoe 56 is conformingly mounted on the external surface thereof. Immediately forward of this shoe 56 is an O-ring seal 58, retained in an external annular groove 60 on the inner barrel 52 by a snap ring (not shown).

The cylindrical shoe 56 is in constant frictional or contiguous engagement with the internal surface 59 of the outer barrel so as to prevent canting of the telescoping section. This frictional engagement also resists forces that might tend to cause telescoping movement during lowering of the terminal pipeline portion 28. It will be appreciated, however, that the friction may be readily overcome to intentionally telescope the inner barrel 52. Also, if desired, other telescoping movement impeding means (for example, shear pins or set screws, mounted on barrel portion 50 and engaging barrel 52) may be employed.

The change in diameter between the enlarged portion 48 of the outer barrel and the trailing outer barrel section 50 produces a shoulder 62 forming one end of the chamber or cylinder 46. Rearward of this shoulder 62 are two threaded openings 64 and 66 extending transversely through the trailing outer barrel section 50 for a purpose hereinafter described.

At the other cylinder end, is mounted a collar 68, externally threaded, as indicated at 70, to cooperate with internal threads 72, on the leading end of the enlarged outer barrel section 48. This collar 68 is comprised of an annular, externally threaded ring 74, having a transverse thickness equal to the transverse dimension of the cylinder. Suitable O-ring seals 76 may be retained in internal annular grooves 78 of the ring 74 so as to seal the chamber 46 from the body of water.

An annular flange portion 80 of the collar 68 is integral with the cylinder portion 74 and dimensioned to abut the annular end face 82 of the enlarged section 48. Adjacent this abutment, and forward of the threads 70 and 72, a further seal 84 is mounted between the flange 80 and an internal shoulder 86 on the enlarged outer barrel section 48.

The collar 68 is provided with a fluid receiving port 88 extending longitudinally through the ring and flange sections 74 and 80 into communication with the cylinder 46. Threadedly received on the flange 80 so as to communicate with the port 88 is a fluid inlet conduit 90.

Within the chamber or cylinder 46, between the shoulder 62 and the collar 68, are slidably mounted a piston means 92, a locking dog means 94, and a packer seal means 96, extending in that order from the pipeline terminus toward the rear of the chamber.

The piston means 92 comprises an annular ring 98 having external and internal diameters which will clear, but be telescopingly related to those of the cylinder 46. Suitable O-rings (not shown) are mounted on external and internal grooves 100 of the ring 98, so as to engage the inner and outer barrels 52 and 48, and seal the locking dog means 94 and packer seal means 96 from the fluid receiving port 88.

A cross-sectionally, generally stepped face shoulder 102, forming the longitudinally innermost face of the ring 98, is adapted to drivingly engage the locking dog means 94.

This locking dog means 94 includes a plurality of circumferentially spaced, longitudinally extending locking dog segments or slips 104, each having a generally cylindrical, circumferential extent of about 30°. Each of these dog segments is provided with a toothed, radially inner face 106, for lockingly engaging the inner barrel 52. The outer longitudinally facing ends 108 of the dogs are generally stepped faced in transverse cross-section in complementary correspondence with the stepped face piston shoulder 102.

Each dog segment is further provided with two, spaced, radially inwardly facing grooves 110 for receiving suitable annular, split snap rings 112. One of these grooves is located along the toothed face 106 and the other is located between the toothed face 106 and the stepped shoulder 108. These snap rings normally bias each dog segment 104 out of engagement with the inner barrel 52.

It will be appreciated that the use of these rings to so bias the toothed faces 106 of the slips 104 out of engagement obviates the need for a slidable sleeve, or the like, to prevent locking prior to the desired time. A well packer which operates in a manner generally similar to the slip joint of the present invention, but requires a slidable sleeve is disclosed in U.S. Pat. No. 3,233,674 to Leutwyler.

Because of the bias provided by the rings 112, the piston means 92, the locking dog means 94 and the packer seal means 96 may all be in continually direct communication with the inner and outer barrels, to thereby avoid the need for a sleeve moving means and the possibility of jamming thereof when locking is desired.

The longitudinally forward, and radially outermost faces 114 of each dog segment 104 are shaped as frusto-conical segments, inclined toward the pipe centerline. An annular retainer wedge member 116, provided with a radially inner frusto-conical face 118 cooperates with the inclined dog surfaces 114 to thereby control the radial and axial positions of the locking dogs so as to normally prevent movement thereof.

The longitudinally extending, radially outer face 120 of the wedge 116 is telescopingly received within the enlarged outer barrel section 48, and the radially extending, longitudinally rearmost face 122 is adapted to drivingly engage the packer seal means 96.

This packer seal means 96 includes an annular, expansible rubber packer 124 sandwiched between two annular, radially deformable or expansible seals 126 and 128 of any suitable metallic, composite or plastic material. With the slip joint in the unlocked position, as illustrated in the upper portion of FIG. 5B, both of the seals 126 and 128, as well as the rubber packer 124 may not quite fill the cylinder 46.

To lock the telescoping terminus 38 with respect to the remaining portion of the pipeline 30, fluid is introduced through the fluid inlet conduit 90 and the fluid passage 88 into the cylinder 46. This introduction of fluid may be accomplished by remotely operated means or through diver assistance. In remotely controlled operations, the fluid may be conveniently supplied from a surface station 129 (FIG. 3) on the barge 26 through a flexible umbilical 131.

The locking fluid may be hydraulic or grout or any other suitable cementitious or settable material.

If a settable material is employed, it may be possible to utilize or dispense with the locking dog segments 104 and wedge means 116, since the set material would secure piston 98 in its seal expanding position. In this event, however, a bleed conduit, such as conduit 90a should be provided in barrel 48 to allow the settable fluid to displace air within the cylinder 46. This bleed conduit may extend to the surface as a part of the umbilical package 131. Such a bleed conduit would be valve controlled so that, after air has been expelled from cylinder 46, conduit 90a may be closed to permit fluid supplied by conduit 90 to adequately pressurize the interior of cylinder 46. Such a bleed control valve may be manually or remotely operable and may be mounted directly on barrel 48.

Slips or locking dog segments 104, if used, cooperate with wedge means 116 to lock the barrel 52 within the barrel 48. This locking may be enhanced by providing the exterior of wedge means 116 with "teeth" to grippingly engage the barrel 48.

Where a "settable" actuating fluid is employed, and the locking slip means and wedge means are not utilized, portions of the interior of barrel 48 and the exterior of barrel 52 in cylinder 46 may be configured to lockingly cooperate with the "set" actuating fluid.

If desired, the fluid passage 88 or the inlet conduit 90 may house a check valve (not shown) for the purpose of entrapping the desired fluid medium in the cylinder 46. Corrosion may thereby be inhibited.

This fluid pressure acts on the radially extending, longitudinally forward piston face 130 of the ring 98, so as to urge the piston means 92 longitudinally inward of the cylinder 46, as illustrated in the lower portion of FIG. 5B.

The driving face 102 of the piston means engages the complementary, generally stepped driven faces 108 of the locking dogs 104. Longitudinally inward movement of the dogs causes their inclined faces 114 to be cammed radially inwardly by the mating face 118 of the wedge member 116, to thereby lock the toothed portions 106 into engagement with the inner pipe barrel 52 against the bias of the retainer snap rings 112.

It will be appreciated that the gap provided by the split in the snap rings 112 is sufficiently large to accommodate for the radial contraction of the surface defined by the peripheries of the locking dogs 104. Moreover, the circumferential spacing between the dog segments is such that the dogs are permitted to move closer together circumferentially, upon such radial contraction. In the radially innermost position, the dogs may or may not be in contact with one another.

Pressure on the outer piston face 130 also moves the wedge further longitudinally inward of the chamber 46, whereby the rearmost face 122 of the wedge compresses the seal means 98 by engaging the outermost seal member 126. This compressive engagement, together with the reaction force provided by the outer barrel shoulder 62 causes the seals 126 and 128 and the rubber packer 124 to radially expand into sealed, packed engagement with the inner and outer barrels.

As indicated at 132, the seals form beads between the wedge means and the inner barrel, and between the outer barrel and the inner barrel, to provide a fluid tight seal. The tapered segments of the locking dogs 104 and the wedge member 116 secure the telescoping terminus 38 within the pipeline 30 in the locked and sealed position as a result of the entrapped fluid in the cylinder 46. In addition, if the fluid medium comprises a settable material, this medium also provides a locking and sealing means.

Additional, permanent locking and sealing means may be provided by admitting epoxy through a conduit 134 threadedly engaged with one of the previously identified transverse openings 64, located in the outer barrel rearward of the shoulder 62. Another suitable conduit 136 threadably engaged with the other transverse opening 66 provides an escape passage for air displaced by the epoxy. Conduits 134 and 136 may be included in the umbilical package 131.

The epoxy is permitted to permanently set in the small annular chamber 137 bounded by the inner and outer barrels, the rearmost seal member 132, and the O-ring seal 58 adjacent the alignment shoe 56.

If desired, the conduits 134 and 136 may be subsequently sealed off, possibly by manually or remotely operable valve means mounted on barrel 50, after which the davit lines 34 and the umbilical 131 may all be released by a diver, or explosive means, or in any other suitable manner.

Figure 7:
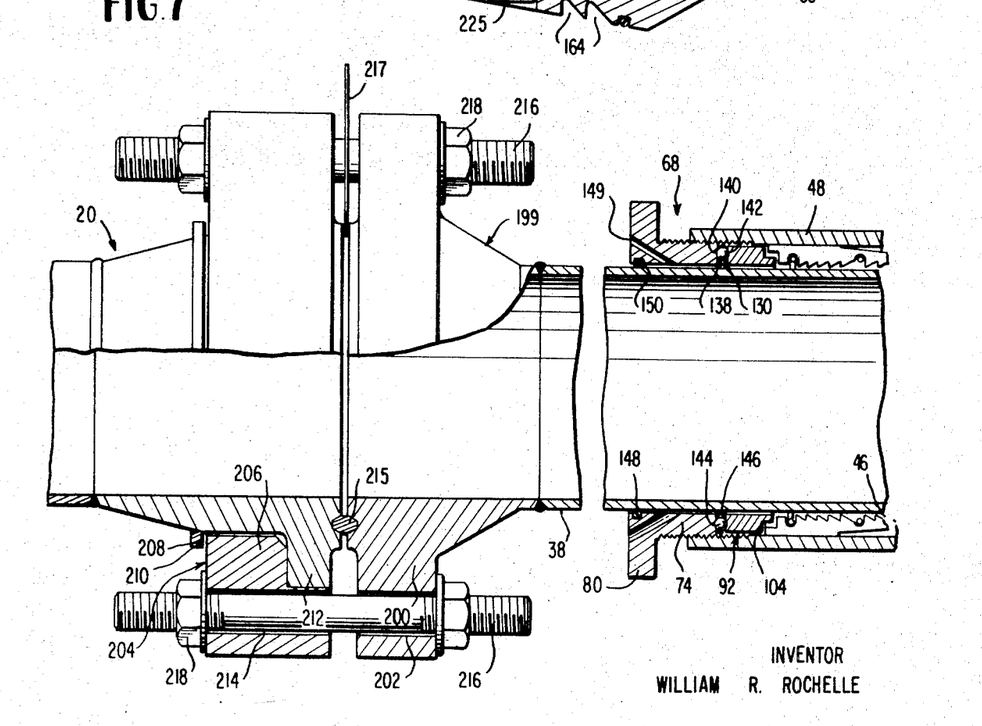
FIG. 7 is a partial cross-sectional view of an alternative connection between the telescoping terminus and an underwater installation, and an alternative piston moving means for the slip joint.

In instances where remote locking of the slip joint means 44 is not desired, a diver operable locking assembly may be alternatively provided (FIG. 7). This assembly is substantially identical to that described in connection with FIG. 5B, except for the modification of the collar 68.

In the case of a diver installed locking operation, the ring portion 74 of the collar 68 is elongated for adjustably threadably engaging the outer pipe barrel section 48. The longitudinally inner, radially extending face 138 of the collar and the adjacent outer face 130 of the piston means 92 are each annularly grooved, as indicated at 140 and 142, to receive a set of thrust balls 144 mounted within an annular retainer 146.

Suitable spanner wrench slots (not shown) may be provided on the outer flange 80 of the collar. As the take-up collar 68 is rotated, the thrust balls 144 transmit the longitudinal motion of the collar to the piston means 92 to complete the locking operation, as described in connection with the fluid operable method.

Of course, the provision of a fluid receiving passage in the collar is obviated. However, a suitable seal 148 may be placed in an internal collar groove 150 to prevent entry of water into the chamber or cylinder 46, and a suitable port 149 having a valve (not shown) could be provided in the collar 68 for admitting a permanently settable material into the cylinder 46.

It will be appreciated that both of the described embodiments of the slip joint involve an internally telescoping section. Although an externally telescoping section may be employed, the described arrangement is preferred since less apparatus is located in the relatively vulnerable, external location, i.e., there is no need to move the slip joint locking and sealing components prior to the locking operation since the external barrel which provides the ends of the cylinder 46 (by means of the shoulder 62 and collar 68) is not telescoped.

Moreover, an internally telescoping section is more amenable to a generally axial application of the telescoping force, such as that provided by the tensioned flexible drawline. This axial force minimizes the likelihood of canting, and subsequent misalignment of the section which may result from unequal, non-axial drawing forces.

The Latching Structure and Operation

As previously mentioned, the telescoping terminus 38 may be latched or locked into sealed engagement with the riser adapter 20. Referring now to FIG. 5A, this type of latching engagement is there shown.

The riser adapter 20 comprises a guide funnel 151, having a generally radially outwardly flaring frustoconical terminus 153, adapted to engage the telescoping terminus 38. If the telescoping section is axially out of line with the guide funnel axis, the flaring terminus 153 cams an enlarged locking head 154 provided on the forward end of the telescoping terminus, to thereby axially align the two.

The outer periphery 155 of this locking head 154 is contoured to complementarily engage the inner surface 156 of the guide funnel 151 beyond the outwardly flaring terminus 153. The radially extending end face 157 of the locking head 154 is provided with an annular longitudinally projecting shoulder 158.

This shoulder 158 is adapted to be received in an annular groove 160 formed in an internal, radially extending annular face 162 of the guide funnel. With the projection 158 received in the groove 160, the end face 157 of the locking head, and the internal radial face 162 of the guide funnel abut one another so as to prevent further movement of the telescoping section into the riser. Suitable seals 165 are provided between the latched head and the riser. Of course, a metal to metal seal may be alternatively provided, or, a suitable cementitious material may be pumped into suitably formed grooves (not shown) on the head 154 for sealing purposes.

The outer periphery 155 of the locking head 154 is provided with two annular, pin receiving grooves 164. These grooves 164 are engaged by a plurality of circumferentially spaced, approximately 30° segmental, locking projections 166.

Each of these projections 166 is provided with two ratchet-like teeth 168 for engaging the pin receiving grooves 164 to thereby latch the telescoping terminus to the guide funnel.

The projections 166 are biased radially inwardly by springs 170 so as to normally project beyond the internal surface 156 of the guide funnel. A lateral shoulder 169 prevents the projections from moving fully into the funnel by engaging the outer funnel periphery.

As the locking head 154 is moved into the guide funnel through drawline tension, piston and cylinder assemblies, external cables or diver assistance, the outer surface thereof cams against the inclined surfaces 171 of the teeth 168, against the bias of the springs 170, to force the projections outwardly of the guide funnel until such time as the teeth receiving grooves 164 are aligned therewith. The bias of the springs 170 thereafter forces the teeth 168 into latched engagement with the grooves 164. The preferably generally radially extending surfaces 173 of the teeth prevent the head 154 from subsequently moving out of the riser adapter 20.

In FIG. 5A two forms of projections 166 are illustrated. Each of these is slidably fit in a slot 172, extending transversely through the outer wall of the guide funnel 151, and communicating with a chamber 174 defined by a bracket 176 mounted about the outer surface of the guide funnel. Each chamber 174 may comprise a circumferentially isolated, individual projection. Two types of such projections are illustrated. Obviously, either form of housing defining bracket could be circumferentially extended to provide an annular chamber encircling the receiving head 20.

The upper projection 166 of FIG. 5A is shown as formed with a spring receiving pocket 178, against the bottom of which one end of the spring 170 bears. The other end of the spring 170 bears against a bracket plate 179 closing the chamber 174 in any suitable manner, such as by screws 180.

A spring retainer screw 182 projects into the chamber 174 and the coil spring 170 is centered thereon. This screw 182 may be removed, and a longer and smaller diametered screw (not shown) may be threaded into a central threaded aperture 183 in the projection 166, so that the projection may be retracted when release of the latching structure is desired.

It is readily apparent that a positive mechanical lock may be accomplished by divers advancing each screw 182 toward its associated projection 166 to lockingly bear against the flat outer surface of the projection 166.

An alternative form of the projection 166 is shown on the lower portion of FIG. 5A. This projection is provided with a stem 184 about which the spring 170 is centered. The spring bears against the projection outer face 186 and the inner face 188 of a stem receiving housing 190.

This housing 190 is centrally apertured, as indicated at 192, for slidably receiving the stem 184 as the projection 166 is cammed by the head 154. The end of the stem receiving member 190 projects outwardly beyond the bracket 176 and is threaded at 194 for removably receiving a threaded cap 196.

When it is desired to retract the locking projection 166, the cap 196 may be removed by a diver and a threaded pin (not shown) may be inserted through the housing aperture 192 into engagement with a threaded aperture 198 at the top of the stem 184. This pin may thus be used to pull the projection out of engagement with the grooves 164 against the bias of the spring 170.

Positive mechanical locking may be readily accomplished by diver removal of the cap 196 and insertion of a screw (not shown) into the threaded aperture 198. This screw would be of sufficient length to bear against the inside of cap 196 so as to prevent outward movement of the stem 184, with the cap 196 reinstalled.

In an application where remote locking or unlocking is advantageous, a fluid operable reciprocating piston may be attached to the locking projection 166. Pressure applied to opposite sides of the piston faces in the chamber 174 permits remote, selective retraction and insertion of the locking dogs.

Alternatively, a double acting hydraulic cylinder and piston assembly may be provided, wherein a locking cylinder is interference fitted with the outside diameter of the piston rod to provide a mechanical connection to lock the rod in any position of its stroke. Hydraulic pressure may be introduced between this cylinder and the rod to thereby expand the cylinder radially so as to relieve the interference and permit the rod to be stroked with a minimum of resistance. Removal of this latter pressure results in re-engagement of the cylinder so that the assembly is "fail-safe" in the case of pressure loss. A suitable assembly of this type is available from the American Machine and Foundry Company, York, Pennsylvania, under the registered trademark BEAR-LOC.

Referring now to FIG. 7, an alternative alignment means for use in diver attachment of the telescoping terminus to the riser 16 is there shown.

In this assembly, the outer portion of the terminus 38 is provided with a head 199 having an annular locking flange 200 integrally attached thereto at its outer end. This flange 200 is provided with a plurality of circumferentially spaced, longitudinally extending bolt receiving apertures 202.

The riser adapter 20 is provided at its outer end with a second annular flange 204 rotatably mounted thereon. This flange is an adaptation of a lap joint flange common to the industry. A radially inwardly projecting shoulder 206 of this second flange is rotatably receivable in a pocket 208 defined by spaced outward projections 210 and 212 from the riser adapter.

One of these projections 210 may be welded on the adapter subsequent to the installation of the rotatable flange 204.

A plurality of circumferentially spaced, longitudinally extending bolt receiving slots 214 are provided in the flange 204. The circumferential spacing is identical to that of the slots 202 in the flange 200.

When the telescoping section head 199 is moved toward the riser adapter 20, the riser flange 206 is rotated to align the apertures 214 and 202. Suitable locking bolts 216 are extended through these apertures 202 and 214 to draw the head 199 and the riser adapter 20 into abutting engagement where they are locked by nuts 218. A ring joint flange seal or other type of seal 215 may be provided at the interface to seal the locked coupling.

As illustrated at 217, a handle is provided for permitting ready installation of the ring joint flange 215 by a diver without the necessity of his placing his hands between the flanges. Reference may be had to U.S. Pat. No. 1,896,795 for a more detailed description of a suitable handle of this type.

The Drawline Releasing Means

Figure 6:
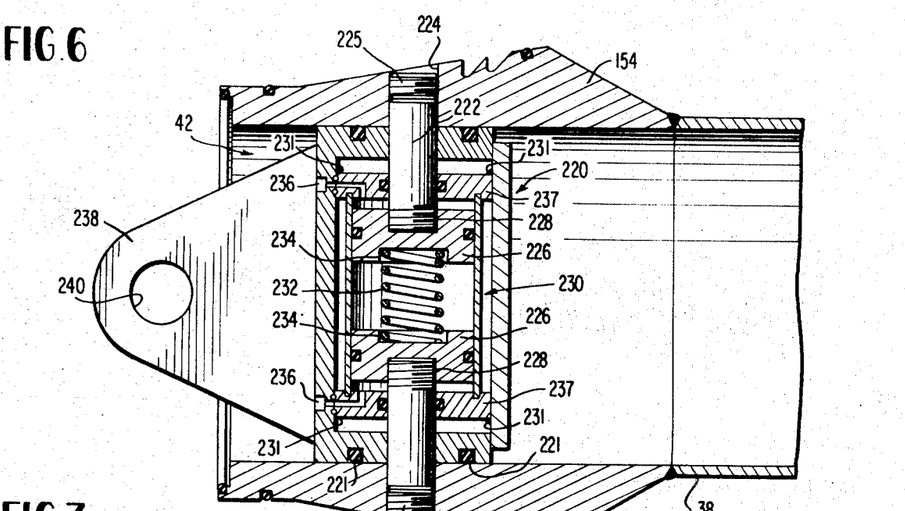
FIG. 6 is a cross-sectional view of a fluid responsive means for releasing the drawline from the telescoping terminus.

As previously mentioned, a fluid responsive drawline releasing means 42 may be provided on the end of the telescoping terminus 38 (FIGS. 6 and 5A).

This drawline releasing means includes a housing 220 having an external diameter substantially equal to the internal diameter of the alignment head 154. Suitable seals 221 may be provided between the housing and the head.

A pair of circumferentially spaced securing pins 222 project radially from the housing into radially extending apertures 224 in the head 154. These apertures are sealed with plugs 225. The pins 222 are threaded as indicated at 228 into two opposed, spring loaded pistons 226 within the housing 220.

The pistons 226 are slidably mounted in a cylinder 230 anchored within the interior of the housing 220 and 231. The pistons 226 are outwardly biased, so as to maintain the pins 222 in the head apertures 224, by means of a spring 232 bearing against, oppositely facing, aligned pockets 234 in the inner faces of the pistons. Thus, the housing 220 is normally attached to the telescoping terminus.

Fluid ports 236 are located in the longitudinally outermost housing wall and in communication with the cylinder ends 237. Fluid admitted through these ports 236 forces the pistons 226, against the bias of the spring 232, radially inwardly toward one another, to thereby withdraw the pins 222 from the head apertures 224.

This fluid may be introduced by flooding the riser above water level 18 (FIG. 1), or by pressuring fluid in the riser by pumps, etc. to thereby accomplish a remote drawline releasing operation.

It will be apparent that if the telescoping terminus is improperly seated in the riser adapter (i.e., in an unlatched position) any attempt to activate the drawline release means would not be successful insofar as the pressurized fluid would flow past the enlarged head 154 (FIG. 5A) and out of the riser adapter. Thus, the drawline release means is "fail-safe" since it may not be operated until the telescoping joint is latched in sealed engagement with the riser adapter.

Tension applied to the drawline, after release thereof, permits withdrawal of the housing 220 through the riser, since the maximum external diameter of the housing assembly 220 is less than the internal dimension of the riser.

It will be appreciated that the forward end of the housing 220 is provided with an outwardly projecting anchor 238, having an eyelet 240. Through this means the drawline may be secured to telescoping terminus 38 via the housing 220 as indicated by suitable drawline anchor means 242 (FIG. 5A).

In the event that riser flooding is not desired, a hydraulic umbilical means (not shown) may be coupled to the fishline 22, and secured in fluid communication with the ports 236 at the time of connecting of the fishline to the pull line 22. Suitable fluid handling apparatus, including the umbilical means and a handling reel 24 (FIG. 1) may be provided in a manner similar to that disclosed in U.S. Pat. No. 3,396,747, assigned to the assignee of the present invention.

SUMMARY OF ADVANTAGES

Thus, it may be seen, that in following the present invention an improved method and apparatus for completing the connection of an underwater flowline to an underwater installation or conduit means is provided.

Particularly significant is the use of a telescoping section as the conduit terminus so as to compensate for anticipated differences in distances between the laid pipeline and the underwater installation.

Of further significance is the use of such a telescoping terminus in connections which are made adjacent the water surface and subsequently lowered so as to minimize the difficulties involved in placement of such connections and their associated conduit means at the desired underwater location.

The locking and sealing aspects of the telescoping joint afford a unique combination of adjustability and structural rigidity.

When the preferred internally telescoping terminus is employed, the possibility of canting of the section is minimized and the smooth operation of the slip joint, between the terminus and the remaining conduit portion, is enhanced.

Moreover, the locking and sealing of the telescoping joint adjacent both ends thereof provides added support for and enhances the life of any conduit connections employing such a joint.

Of independent significance is the provision of a fluid operable, remotely controllable, drawline releasing means that may not only be operated at selected times so as to avoid malfunctioning problems, but may also be fail-safe in connection with riser flooding activation.

Also of importance is the particular slip joint locking means between relatively movable conduit sections. The continued direct communication of all portions of this locking means with the outer and inner pipe barrels avoids the need to remove elements prior to the locking operation.

Although the invention has been described with reference to several preferred illustrated embodiments, it will be appreciated by those skilled in the art that additions, modifications, substitutions, deletions and other changes not specifically described may be made which fall within the spirit of the invention.

What is claimed is:

1. A method of laying pipeline carried by floating vessel means and provided with a telescoping conduit terminus, telescopingly movable with respect to a conduit body portion of the pipeline, the laying being either toward or away from an underwater installation provided with means for aligning the telescoping terminus with the underwater installation, the method comprising:

connecting a flexible drawline to the telescoping terminus;

lowering the terminal portion of the pipeline, including the telescoping terminus, from the floating vessel means to a submerged position adjacent the alignment means, while maintaining the terminus in a substantially fixed longitudinal position with respect to said body portion of the pipeline; and applying tension to the flexible drawline to move the telescoping terminus longitudinally with respect to said pipeline body portion and into engagement with the alignment means.

2. The method of laying pipeline according to claim 1, wherein the pipeline is laid toward the underwater installation, the method further including the step of:

laying the major portion of pipeline, exclusive of the terminal portion including the telescoping terminus, toward the underwater installation and onto the submerged surface from the floating vessel means, prior to connecting the flexible drawline to the telescoping terminus;

the connecting step then being accomplished at a surface location of the floating vessel means; and the lowering step then being performed to locate the telescoping terminus at a submerged position spaced from the alignment means.

3. The method according to claim 1, wherein the pipeline is laid away from the installation, and wherein:

both the lowering step and the pipeline laying are accomplished, at least in part, by slidably moving the floating vessel means with respect to the pipeline.

4. A method of effecting connection between first and second submerged conduit means one of which is provided with a telescoping conduit portion movable with respect to a conduit body portion, the method comprising:

supporting said first conduit means above a water surface;

submerging at least an end portion of said first conduit means by generally lowering said end portion of said first conduit means from support means located at least in part above said water surface;

positioning said first conduit means at a submerged location in generally aligned relation relative to said second, submerged conduit means;

telescopingly adjusting said telescoping portion of said one of said conduit means in relation to said body portion and the other of said conduit means;

locking said telescopingly adjusted telescoping portion of said one of said conduit means in generally sealed, fluid communicating relation with said other of said conduit means; and locking said adjusted telescoping portion of said one of said conduit means in generally sealed, fluid communicating relation with said other of said conduit means.

5. Apparatus for effecting connections between submerged conduit means, the apparatus comprising:

first and second conduit means, at least one of which is provided with a telescoping conduit terminus movable with respect to a conduit body portion;

means for supporting at least one of said first and second conduit means above a water surface;

means for lowering at least an end portion of said one of conduit means to a disposition generally aligned with said second, submerged conduit means;

means for locking and sealing said telescoping terminus of said one of said conduit means, in at least partially telescopingly adjusted position in relation to said body portion and said other of said conduit means, in generally sealed, fluid communicating relationship with said first conduit means; and means for locking and sealing said telescoping terminus, in generally sealed, fluid communicating relationship with said second conduit means.

6. A method of connecting an underwater pipeline to an installation conduit, the method comprising:

providing one of the pipeline and the installation conduit with a telescoping terminus movable, within a range of movement, generally longitudinally with respect to a remaining body portion by an amount within that range, with the telescoping terminus defining an adjustable conduit section extending between and for providing communication between said body portion and the other of the pipeline and the conduit;

connecting the telescoping terminus to the other of the pipeline and the installation conduit adjacent the surface of the water while buoyantly supporting at least the pipeline; and lowering the connected pipeline and installation conduit to a submerged surface.

7. The method according to claim 6 wherein:

the lowering step is performed with the telescoping terminus maintained in a fixed position relative to the pipeline and the installation conduit; and the telescoping terminus is subsequently telescoped to move the installation conduit to a position in engagement with the installation.

8. The method according to claim 6 wherein:

the lowering step is performed while the telescoping terminus is permitted to telescope relative to the one of the pipeline and the installation conduit to which it is provided.

9. A method of connecting an underwater pipeline to an installation conduit, the method comprising:

providing one of the pipeline and the installation conduit with a telescoping terminus;

connecting the telescoping terminus to the other of the pipeline and the installation conduit adjacent the surface of the water while buoyantly supporting at least the pipe-line; and lowering the connected pipeline and installation conduit to a submerged surface, said lowering step being performed with the telescoping terminus maintained in a fixed position relative to the pipeline and the installation conduit; and said telescoping terminus being subsequently telescoped to move the installation conduit to a position in engagement with the installation.

10. A method of connecting an underwater pipeline to an installation conduit, the method comprising:

providing one of the pipeline and the installation conduit with a telescoping terminus;

connecting the telescoping terminus to the other of the pipeline and the installation conduit adjacent the surface of the water while buoyantly supporting at least the pipeline; and lowering the connected pipeline and installation conduit to a submerged surface, said lowering step being performed while the telescoping terminus is permitted to telescope relative to one of the pipeline and the installation conduit to which it is provided.

11. In a method of laying pipeline carried by floating vessel means toward or away from a fixed underwater installation, and wherein the method includes the step of placing the pipeline and a conduit for forming a portion of that installation in fluid communication, the improvement comprising:
  providing one of the pipeline and the conduit with a telescoping terminus movable, within a range of movement, generally longitudinally with respect to a remaining body portion by an amount within that range, with the telescoping terminus defining an adjustable conduit section extending between and for providing communication between said body portion and the other of the pipeline and the conduit;
  positioning the pipeline at a location relative to the fixed underwater installation wherein the pipeline and the installation are separated by an undetermined distance;
  telescoping said telescoping terminus, within its range of movement so as to accomodate for said undetermined separation distance between the pipeline and the installation.

12. The method according to claim 11 wherein the telescoping terminus is provided the pipeline as an internally telescoping terminus 13. The method according to claim 11 including the step of locking the telescoping terminus with respect to the one of the pipeline and the conduit provided therewith.

14. The method according to claim 11 wherein:
  the pipeline and the conduit are placed in fluid communication adjacent the surface of the water by connecting the telescoping terminus to the other of pipeline and the conduit, and including the step of
  lowering the connected pipeline and installation conduit to a submerged surface.

15. The method according to claim 14 wherein:
  the lowering step is performed with the telescoping terminus maintained in a fixed position relative to the pipeline and the installation conduit; and
  the telescoping terminus is subsequently telescoped to move the installation conduit to a position in engagement with the installation.

16. The method according to claim 14 wherein:
  the lowering step is performed while the telescoping terminus is permitted to telescope relative to the one of the pipeline and the installation conduit to which it is provided.

17. The method according to claim 11 wherein the pipeline is provided with the telescoping terminus and wherein the step of positioning the pipeline at a location relative to the fixed underwater installation wherein the pipeline and the installation are separated by an undetermined separation distance comprises:
  lowering the pipeline with the telescoping terminus located between its fully extended and retracted positions.

* * * * *